United States Patent [19]

Wong

[11] Patent Number: 5,029,094
[45] Date of Patent: Jul. 2, 1991

[54] COMPUTERIZED PARKING METER SYSTEM

[76] Inventor: Edward Y. Wong, F. 6, No. 8, Lane 143, Sec. 3, Thern I Rd., Taipei, Taiwan

[21] Appl. No.: 383,724

[22] Filed: Jul. 24, 1989

[51] Int. Cl.$^5$ ............................................. G07B 15/00
[52] U.S. Cl. ................................. 364/467; 340/932.2; 340/943; 368/7; 368/90
[58] Field of Search ............................. 340/932.2, 943; 364/464.01, 467; 368/6, 7, 90

[56] References Cited

U.S. PATENT DOCUMENTS

| | | | |
|---|---|---|---|
| 3,114,128 | 12/1963 | Ljungman et al. | 340/943 X |
| 3,376,547 | 4/1968 | Auer, Jr. | 340/943 X |
| 3,815,718 | 6/1974 | Singer | 364/467 |
| 3,999,372 | 12/1976 | Welch et al. | 368/90 X |
| 4,310,890 | 1/1982 | Trehn et al. | 340/932.2 X |
| 4,356,903 | 11/1982 | Lemelson et al. | 364/467 X |
| 4,379,334 | 4/1983 | Feagins, Jr. et al. | 364/467 |
| 4,823,928 | 4/1989 | Speas | 368/7 X |
| 4,861,971 | 8/1989 | Chan | 364/467 X |
| 4,908,617 | 3/1990 | Fuller | 340/932.2 |

Primary Examiner—Parshotam S. Lall
Assistant Examiner—Edward R. Cosimano
Attorney, Agent, or Firm—Notaro & Michalos

[57] ABSTRACT

The present invention relates to a computerized parking meter system which comprises a host computer and a plurality of parking meters. Each parking meter is provided with a supersonic metal sensor to register parking time, to calculate parking fees and to automatically detect whether a specified parking space is available for a car whereby overtime parking can be accurately recorded. The parking meters are connected to the host computer over power lines.

1 Claim, 4 Drawing Sheets

COMPUTERIZED PARKING METER SYSTEM

BACKGROUND OF THE INVENTION

The present invention relates to a computerized parking meter system which is designed to modify the currently available coin-inserting type mechanical parking meter so as to minimize the manpower required for parking management.

Due to the restriction of their basic mechanical structure, the prior art parking meters can only count down from a present value to zero so that such prior art parking meters can not meet the requirements of multi-function purpose.

In summary, the disadvantages existing in the prior art parking meter are mainly as follows:

1. Owing to their simple mechanical configuration, the prior art parking meters can only count down with a fixed charging rate. The charging rate cannot be automatically adjusted for different situations. The charging rate should, for example, be automatically adjusted higher or higher when parking for a longer period of time and the charge for peak hours should be higher than for normal hours, so that the parking turn over rate can be significantly improved.

2. For prior art parking meters, an operator has to supervise hundreds of such parking meters simultaneously, and needs to inspect each of them as to whether the allowable parking time has expired. However, it is hard to effect his job efficiently and reliably.

3. In general, a client normally can not accurately preestimate his parking time. Under such circumstances, if a client's parking time has not yet expired when he decides to leave he has no way to get change back from the prior art parking meters, however, if a client parks over time, he has to be punished. It is unfair to such clients especially in the event that a next client can use this non-expired parking space without paying any parking fee.

It is, therefore, the object of the present invention to obviate and to mitigate the aboveidentified drawbacks.

SUMMARY OF THE INVENTION

It is the primary object of the present invention to provide a computerized parking meter system by which the charging rate can be adjusted according to different parking periods, such as peak parking period having a higher charging rate and non-peak parking period having a lower charging rate, so as to provide clients with more reasonable parking fee schedules.

It is another object of the present invention to provide a computerized parking meter system by which the charging rate can be adjusted in accordance with the parking duration of time for instance, the charging rate for the first parking hour is US$ 0.5/hour while the charging rate for the second parking hour is increased to US$ 1.0/hour . . . etc. By so doing, the long-term parking will be discouraged and thus the parking turn over rate can be significantly improved.

It is another object of the present invention to provide a computerized parking meter system by which the human-made mistake as commonly existed in the use of prior art parking meters can be minimized.

It is another object of the present invention to provide a computerized parking meter system which is controlled by a host computer by which an operator at the control center can realize both occupancy rate of parking and turn over rate of parking on a real time basis, and thus significantly minimize the manpower to handle the above-mentioned matter.

It is another object of the present invention to provide a computerized parking meter system which can accurately register the total amount of parking fees so as to minimize any possible human-made mistake.

DETAILED DESCRIPTION OF THE PREFERRED EMBODIMENT

Figure 1:
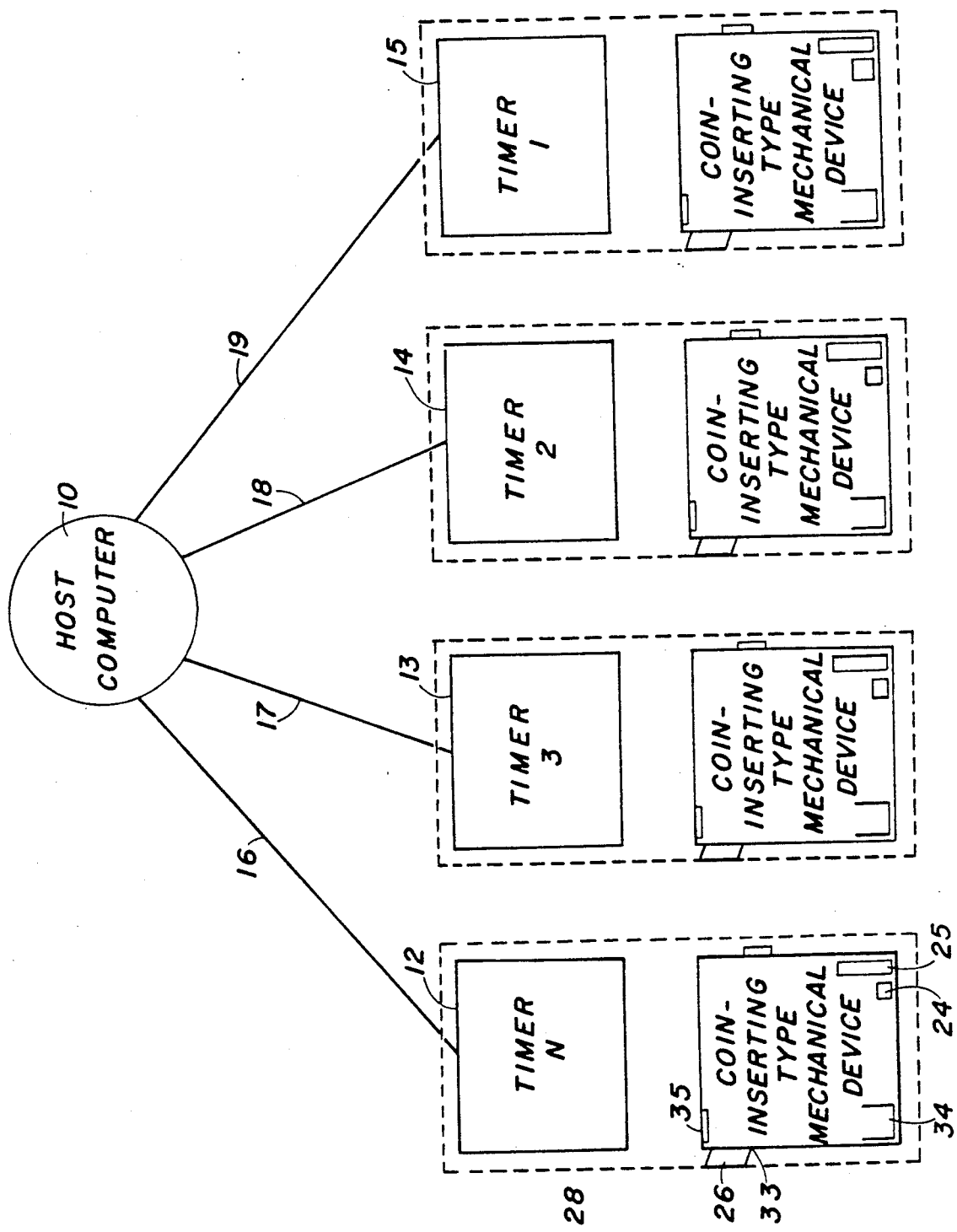
FIG. 1. is a schematic diagram showing the main system according to the present invention.
Figure 2:
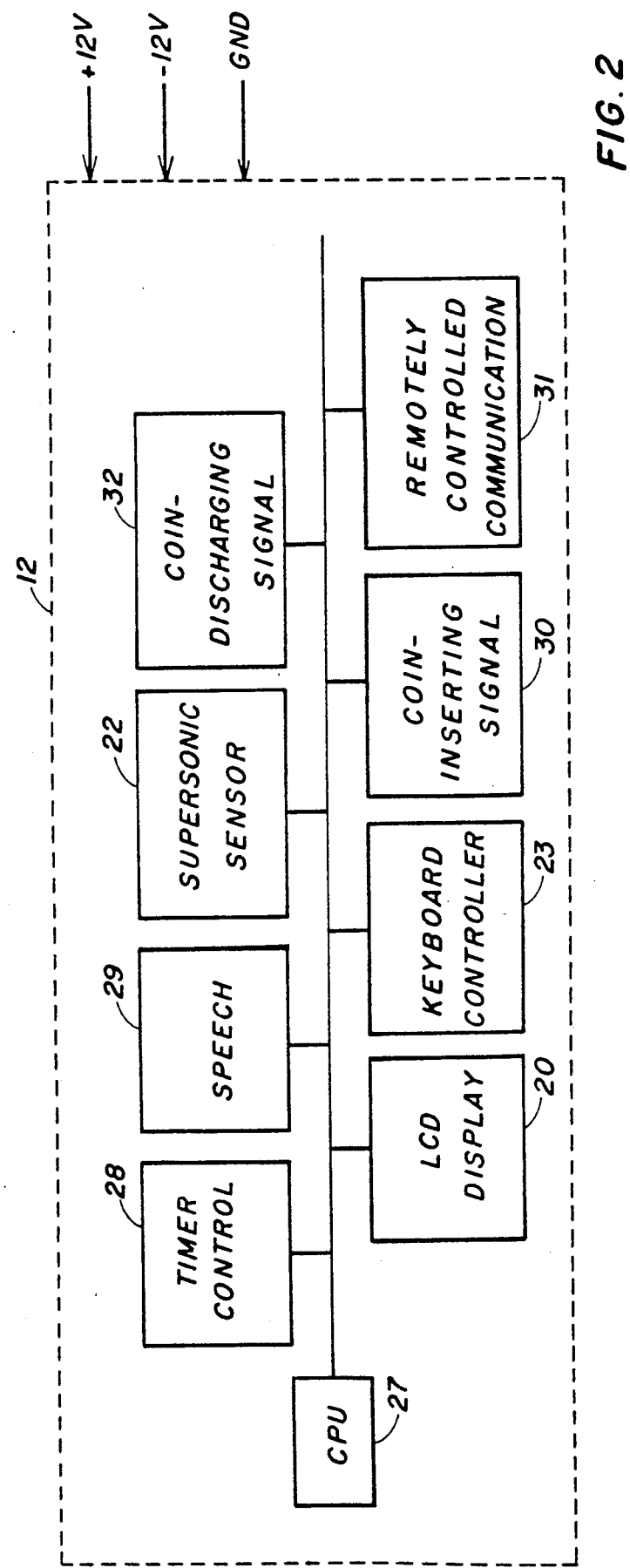
FIG. 2 is a block diagram showing the function of the parking meter according to the present invention.

Referring to FIGS. 1 and 2, the present computerized parking meter system mainly comprises a host computer 10 and a plurality of parking meters 12 to 15 each having a multi-cure cable 16 to 19 respectively connected between the host computer and each parking meter so that the electrical power supplied from the host computer and its data can reach each parking meter, and signals can be mutually transferred therebetween. The host computer can be one of the following microcomputers including APPLE, IBM PC and the like. Each parking meter comprises a panel, a housing and an internal structure. The panel is provided at both front and back sides with 4-digit liquid crystal display (LCD) or light emitting diode (LED) display 20 in order to alternatively display the remaining parking time (or over parking time) and the remaining parking fee (or deficient parking fee). The panel further has an indicative lamp 21 at its front and back side to illustrate the overtime parking. Furthermore, the panel is furnished with a pair of supersonic metal sensors 22 to detect both arrival time and departure time of a car. A keyboard with keyboard controller 23 with keys from 0 to 9, #and * function keys is provided to input a car identified code. A coin-discharging push button 24 associated with a coin-discharging port 25 is provided to discharge the coins.

The housing is used to enclose said internal structure and is rain-proof. The housing is provided at its side with a coin-inserting port 26 through which coins can be inserted into said parking meter.

The internal structure comprises a central processing unit (CPU) 27 to control a timer with timer controller 28, the LCD or LED display 20, a speaker labeled SPEECH 29, a key board controller and keyboard 23, the supersonic metal sensor 22, a coin-inserting 30 and a coin-discharging 32 signal processor and remotely controlled communication circuit 31.

The structure further comprises a coin passage 33 and a coin collection box 34. A second sensor 35 is disposed at the inlet 26 of said coin passage 33 to obtain the related signals and then to transfer said signals to the CPU 27 of the parking meter. The present invention is so designed that only the first coin of inserted coins will fall into the coin collection box 34 and the remaining coins are temporarily stored in the coin passage 33. The second coin will fall into the coin collection box under the control of signals from the CPU when the first period of parking time covered by the first coin is expired. The procedure will continue to proceed until the coins run out. However, the coins remaining in the coin passage can be discharged through the coin-discharging port 25 under the control of coin-discharging signal 32.

The invention can be implemented using a z-80 CPU, 27256 ROM, 65256 RAM, 8251 COMMUNICATION INTERFACE AND 8279 keyboard display interface. The CPU is used to coordinate various functions and to operate in accordance with the monitoring program stored in its ROM; its RAM is used to temporarily store some data including the number of inserted coins, time and sensor signal so as to provide the necessary information for parking; its peripheries interface adapter (PIA) has an ability to communicate the CPU with its peripheries such that the data signals can be transferred from the CPU and RAM to a peripheries, or vice versa; the communication interface is used to transfer the date in timer to the host computer, or to obtain the instruction signals from the host computer for the purpose of operation, and a keyboard/display interface is used to obtain from the keyboard the code input, and to transfer the data to be displayed to the display circuit.

A decoder circuit and a display circuit are also used in the invention. The aforesaid circuits utilize several 4511 seven-segment decoders and 2003 decoders so as to decode the signals output from the 8279 keyboard/display interface and then to display the remaining parking time (or over parking time), the remaining parking fee (or deficient parking fee) and the like.

A circuit for communications and for counting purposes, utilizes a plurality of buffers and latches to register the data and to improve the transmission quality during communication.

A circuit for a supersonic sensor is also used. The circuit serves to detect both arrival time and departure time of the car and uses 8910 programmable function generator to generate various functions in response to a signals from the PIA so as to provide such various functions to the supersonic transmitter circuit for different applicaions, and to receive the return signals through a receiver and then to supply the same to the PIA for serving as control reference.

A coin-inserting sensor signal processor is also needed. A sensor input is connected to the coin-inserting and coin-discharging sensor in order to obtain the input signals and to temporarily store the input signals with latches, and then transfer the input signals, through the PIA, to the CPU for storing and handling of various situations.

A transmission rate generator also acts to generate a transmission rate and then the timer is intended to communicate with the host computer so as to achieve the purposes of transmission of the correct data.

Figure 3:
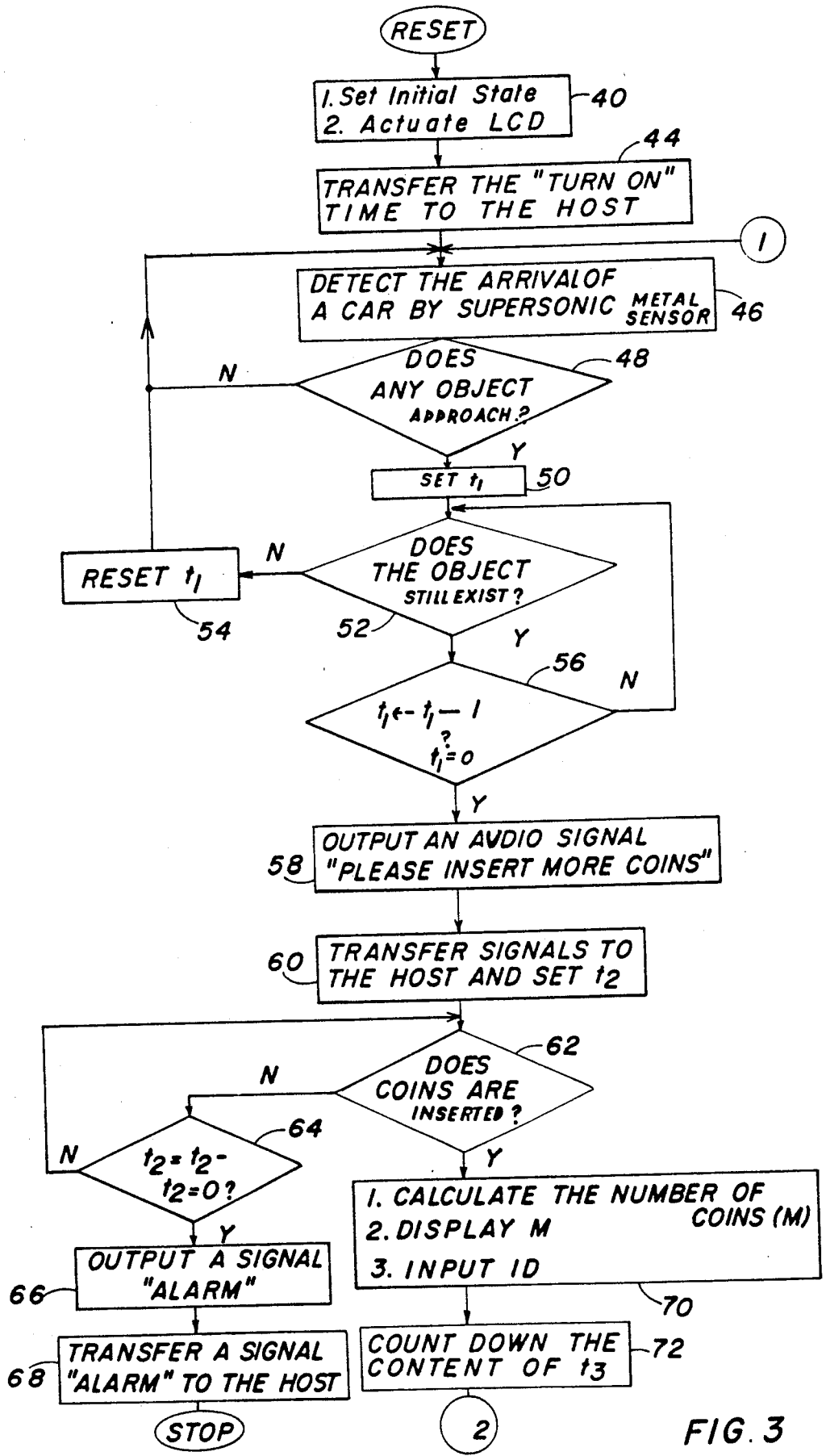
FIG. 3. is a flow chart showing the operation of the present invention.
Figure 4:
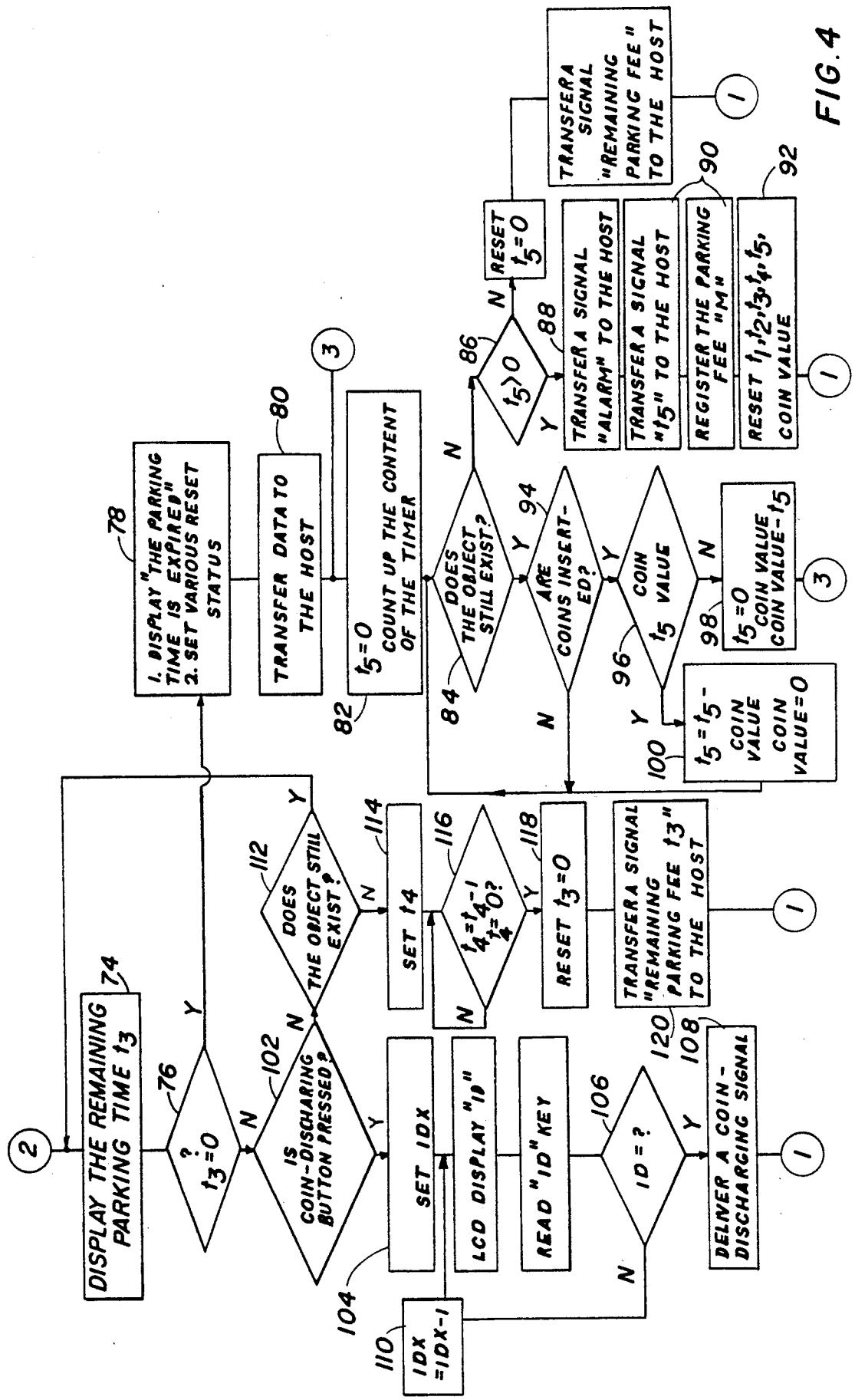
FIG. 4. is a flow chart showing the operation and termination of the present invention.

Referring to FIGS. 3 and 4, in use, the present invention follows the steps as listed below:

In FIG. 3, step 1 at 40 set the initial states; transfer the related signals from the host computer to the CPU of each parking meter; and actuate the LCD.

step2: Transfer the "turn on" time of each parking meter to the host computer at 44.

step3: Detect whether the specified parking space is occupied by a car through a supersonic sensor at 46 if not at 48, then return to step3; if yes, then set t1 at 50.

step4: Detect whether or not the specified parking space is still unavailable at 52; if not, then reset t1 at 54 and return to step3; if yes then subtract 1 from t1 and subsequently check whether t1=0 at 56; if t1 ≠0, then return to step 4; if t1=0, then proceed with step 5 at 58.

step5: Output an audio signal "please insert more coins"; transfer the related signals to the host computer and then register the same; set t2 at 60.

step6: Check whether or not coins are inserted into the specified parking meter at 62; if coins are not yet inserted, thereinto subtract, 1 from t2 and subsequently check whether t2=0; t2≠0 at 64, then return to step 6; if t2=0 then output an alarm signal at 66 and transfer the related signal to the host computer and register the same at 68; if coins are already inserted, thereinto then calculate the number (m) of coins, display the "M" and input the car identified code at 70.

step7: Count down the content of t3 (note that the remaining content of t3 represents the remaining parking time).

In FIG. 4, step8: display t3 at 74, check whether or not t3=0 at 76; if t3=0, display that the parking time is expired and reset related status at 78; transfer related data to the host computer at 80.

step9: Set t5=0 and count up the content of the timer at 82.

step10: Check whether the specified parking space is still occupied by a car through a supersonie sensor at 84; if the specified parking space is available and t5=0 (not shown), then return to step3 at 46 in FIG. 3; if the specified parking space is available and t5>0 at 86, then transfer the alarm signal (88), t5 and parking fee data to the host computer (90), register the contents of t1, t2, t3, t4 and t5 (92), and return to step3.

step11: If the specified parking space is still unavailable (84 is Y), then continue to check whether coins are inserted into the parking meter (94) until coins are indeed inserted thereinto (96) or the car has left if coins have been inserted into the parking meter and t5 is no more than the inserted coin value, then set t5=0 (98) and set inserted coin value=inserted coin value −t5, and return to step 9 at 82; if coins have been inserted into the parking meter and t5 is less then the inserted coin value, then set t5=t5− inserted coin value at 100, and thereafter set inserted coin value=0 and return to step10 at 84.

step12: If t3 is not 0 then check whether the coin-discharging push button is pressed (102); if the coin-discharging push button is pressed, then input the car identified code at 104; check the input identified code (106); if the identified code is correct then delivery the coin-discharging signal and discharge the remaining parking fee (108); and finally return to step 3 at 46 in FIG. 3; if the identified code is incorrect, the same procedure can be repeated up to a predetermined times (110), and thereafter transfer related signals to the host computer in order to notifying the supervisor (not shown), and finally return to step 8 at 74 step13: If the coin-discharging push button is not pressed, then check whether the specified parking space is available through a supersonic sensor (112); the procedure is repeated until the specified parking space is available.

step14 (114): Set t4; subtract 1 from the content of t4 until t4=0(116); reset t3=0(118) and transfer the signal regarding "remaining parking fee" to the host computer (120), and finally return to step 3 at 46 in FIG. 3.

I claim:
1. A computerized parking meter system, comprising:
  a host computer;
  a plurality of parking meters each being connected to said host computer by multi-core cables by which electronical power as well as signals can be trans- ferred between each parking meter and said host computer, each parking meter comprising:

a panel with front and back sides each provided with displays in order to alternatively display a remaining parking time, a remaining parking fee, an over parking time and a deficient parking fee, said panel further having an indicating lamp to illustrate the over parking time;

a pair of sensors to detect both arrival time and departure time of a car;

a keyboard both to input a car identified code for coin-discharging and for over parking time by an operator;

a housing provided with a coin-inserting port through which coins are inserted into said parking meter; and an internal structure including a central processing unit connected with a timer controller, said panel, a speaker, a keyboard controller and said sensors so as to detect a car arrival and departure and to remotely control communication with said host computer, said internal structure further comprising a coin passage and a coin collection box, and a second sensor disposed at an inlet of said coin passage to transfer an inserted coin value signal to said central processing unit.

* * * * *